(12) United States Patent
Minagawa

(10) Patent No.: US 7,861,172 B1
(45) Date of Patent: Dec. 28, 2010

(54) INFORMATION PROCESSING APPARATUS, SYSTEM AND METHOD

(75) Inventor: Tomonori Minagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 09/628,696

(22) Filed: Jul. 28, 2000

(30) Foreign Application Priority Data

Jul. 30, 1999 (JP) ................................. 11-217855

(51) Int. Cl.
*G06F 3/00* (2006.01)

(52) U.S. Cl. .................. 715/735; 571/741; 571/742; 571/743; 571/738; 571/526; 717/177; 717/7

(58) Field of Classification Search ................ 345/700, 345/735, 741–743, 745–747; 709/200–203, 709/223–226, 228, 229; 715/735, 741–743, 715/745–747, 738, 522, 527, 526, 734, 513; 717/177, 7
See application file for complete search history.

(56) References Cited

U.S. PATENT DOCUMENTS

| | | | | |
|---|---|---|---|---|
| 5,220,674 A * | 6/1993 | Morgan et al. | ............. | 709/223 |
| 5,727,135 A * | 3/1998 | Webb et al. | ................ | 358/1.14 |
| 5,729,734 A * | 3/1998 | Parker et al. | .................. | 707/9 |
| 5,768,483 A * | 6/1998 | Maniwa et al. | ............. | 358/1.15 |
| 6,112,256 A * | 8/2000 | Goffinet et al. | ................ | 710/8 |
| 6,266,693 B1 * | 7/2001 | Onaga | ....................... | 709/219 |
| 6,310,692 B1 * | 10/2001 | Fan et al. | .................... | 358/1.14 |
| 6,349,304 B1 * | 2/2002 | Boldt et al. | ................. | 707/102 |
| 6,396,594 B1 * | 5/2002 | French et al. | .............. | 358/1.18 |
| 6,738,152 B1 * | 5/2004 | Roth et al. | ................. | 358/1.14 |

FOREIGN PATENT DOCUMENTS

| | | |
|---|---|---|
| JP | 7-141134 | 6/1995 |
| JP | 10-21263 | 1/1998 |
| JP | 10-44531 | 2/1998 |

OTHER PUBLICATIONS

Microsoft ® Window NT, Version 4.0 (Build 1381: Service Pack 6, RC 1.3), Copyright © 1981-1998 Microsoft Corp.*
Japan Official Action dated Apr. 4, 2008 in Japanese Application No. 11-217855.

* cited by examiner

*Primary Examiner*—Mylinh Tran
(74) *Attorney, Agent, or Firm*—Fitzpatrick, Cella, Harper & Scinto

(57) ABSTRACT

An information processing apparatus, system and method which can manage effectively an image forming apparatus. To accomplish this, a personal computer (30) is connected to a printer (40) for managing parameter sets in which multiple output parameters of the printer (40) are grouped and the personal computer (30) with printer properties for allowing an administrator of a server personal computer to register parameter sets, document properties for allowing an individual user of a client personal computer to register parameter sets, a server profile database for storing the parameters sets that have been registered in the printer properties, and an individual profile database for storing the parameters sets that have been registered in the document properties. A parameter set is read out of the server profile database or individual profile database to change the parameter settings of the printer (40).

9 Claims, 22 Drawing Sheets

FIG. 5A
FIG. 5B
FIG. 5C
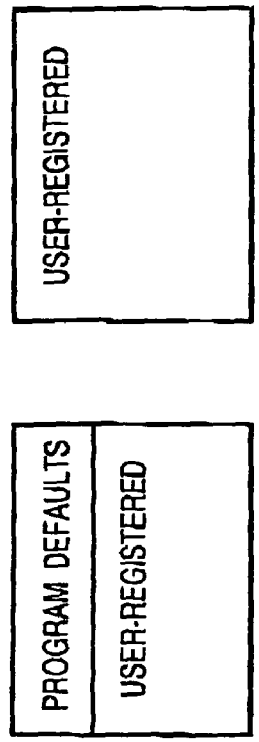
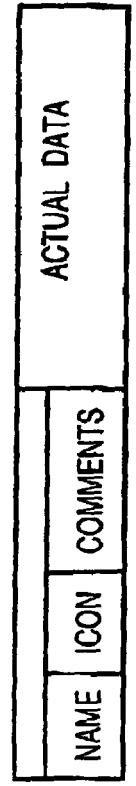

F I G. 21

| LEVEL | SETTINGS | OPERATING LIMITATIONS IN DOCUMENT PROPERTIES |
|---|---|---|
| 0 | ☒ ALLOW SELECTION OF FAVORITES (P)<br>☒ ALLOW EDITING OF SETTINGS (I) | SELECTION, ADDITION AND EDITING OF FAVORITES AND CHANGING OF DETAILED SETTINGS ALLOWED. |
| 1 | ☒ ALLOW SELECTION OF FAVORITES (P)<br>☐ ALLOW EDITING OF SETTINGS (I) | SELECTION OF FAVORITES ALLOWED BUT ADDITION AND EDITING OF FAVORITES AND CHANGING OF DETAILED SETTINGS NOT ALLOWED. SELECTION ONLY OF ITEMS REGISTERED IN SERVER PROFILE DATABASE POSSIBLE. |
| 2 | ☐ ALLOW SELECTION OF FAVORITES (P)<br>☐ ALLOW EDITING OF SETTINGS (I) | SELECTION, ADDITION AND EDITING OF FAVORITES AND CHANGING OF DETAILED SETTINGS NOT ALLOWED. SETTING FORCIBLY FIXED TO SETTING OF FAVORITE SELECTED IN FAVORITES LIST OF PRINTER PROPERTIES. |

F I G. 22

| DIRECTORY INFORMATION |
|---|
| DATA PROCESSING PROGRAM OF FIG. 1<br>PROGRAM CODE GROUP CORRESPONDING TO STEPS<br>OF FLOWCHART SHOWN IN FIG. 7 |
| DATA PROCESSING PROGRAM OF FIG. 2<br>PROGRAM CODE GROUP CORRESPONDING TO STEPS<br>OF FLOWCHART SHOWN IN FIG. 9 |
| DATA PROCESSING PROGRAM OF FIG. 3<br>PROGRAM CODE GROUP CORRESPONDING TO STEPS<br>OF FLOWCHART SHOWN IN FIG. 10 |
| DATA PROCESSING PROGRAM OF FIG. 4<br>PROGRAM CODE GROUP CORRESPONDING TO STEPS<br>OF FLOWCHART SHOWN IN FIG. 13 |
| DATA PROCESSING PROGRAM OF FIG. 5<br>PROGRAM CODE GROUP CORRESPONDING TO STEPS<br>OF FLOWCHART SHOWN IN FIG. 17 |
| DATA PROCESSING PROGRAM OF FIG. 6<br>PROGRAM CODE GROUP CORRESPONDING TO STEPS<br>OF FLOWCHART SHOWN IN FIG. 19 |
| DATA PROCESSING PROGRAM OF FIG. 7<br>PROGRAM CODE GROUP CORRESPONDING TO STEPS<br>OF FLOWCHART SHOWN IN FIG. 20 |
| SERVER PROFILE DATABASE |
| INDIVIDUAL PROFILE DATABASE |
| BUFFER HOLDING STATUS OF LIMITATIONS + FAVORITE SELECTED IN PRN PROP |
| BUFFER HOLDING CURRENT SETTINGS OF PRN PROP |
| BUFFER HOLDING CURRENT SETTINGS OF DOC PROP |

MEMORY MAP OF STORAGE MEDIUM

INFORMATION PROCESSING APPARATUS, SYSTEM AND METHOD

FIELD OF THE INVENTION

This invention relates to an information processing apparatus, system and method for managing an image forming apparatus.

BACKGROUND OF THE INVENTION

An apparatus and system for conventional information processing of this kind manage a parameter set obtained by grouping multiple parameters used for setting an image forming apparatus as a single setting unit. In cases where there are many setting items and the items are mutually dependent in complicated fashions, parameter sets obtained by grouping several setting items together are stored and one parameter set is selected from among a plurality thereof, whereby multiple setting items are changed collectively.

By way of example, items relating to printing quality such as a graphics mode, resolution, color settings and TrueType substitution may be grouped into sets and registered in association with icons as parameter sets under the name "print objective settings". Furthermore, setting items such as layout and paper-feed conditions may also be grouped into sets and registered in association with icons as parameter sets named "favorites". When printing is performed, the parameter set conforming to the printing objective is selected from among these icons, thereby making it possible to change the parameters in a single stroke.

In the prior art described above, however, an apparatus in which it is possible to register parameter sets by both individual users and a server administrator does not exist. As a consequence, overall management by a server administrator and usage on an individual level cannot be realized simultaneously.

SUMMARY OF THE INVENTION

Accordingly, an object of the present invention is to provide an information processing apparatus, system and method, in which an image forming apparatus can be managed effectively.

According to the present invention, the foregoing object is attained by providing an information processing apparatus connected to an image forming apparatus for managing parameter sets in which multiple output parameters of the image forming apparatus are grouped, comprising: first registration means for allowing an administrator of the image forming apparatus to register a parameter sets; second registration means for allowing an individual user of the image forming apparatus to register a parameter sets; first storage means for storing the parameters sets that have been registered by the first registration means; second storage means for storing the parameters sets that have been registered by the second registration means; selection means for selecting a parameter set from the first or second storage means; and setting means for setting output parameters of the image forming apparatus based upon the parameter set that has been selected by the selection means.

The first and second registration means are means for registering a parameter sets by adding identification information which identifies the parameter sets, the first and second storage means are means for storing the identification information in association with the parameter sets, and the selection means is means for selecting a parameter set using the identification information.

The identification information is a character string serving as a name of a parameter set, and the selection means is means for selecting a parameter set by the character string and an identifier which identifies the character set as being a parameter set that has been stored in the first storage means or a parameter set that has been stored in the second storage means.

The apparatus further comprises display means for displaying a graphical user interface, wherein the first registration means includes first display control means for displaying an administrator parameter-set registration screen on the display means, and the second registration means includes second display control means for displaying an individual-user parameter-set registration screen on the display means.

The second display control means is means for listing the parameter sets that have been stored in the first storage means and the parameter sets that have been stored in the second storage means on the individual-user parameter-set registration screen in such manner that the parameter sets can be distinguished from each other.

The first registration means includes registration control means for controlling registration by the second registration means.

The first registration means includes selection control means for controlling selection by the selection means.

The selection control means controls the selection means in such a manner that it is possible to select a parameter set solely from the first storage means.

The selection control means controls the selection means in such a manner that it is possible to select only a parameter set that the administrator has selected from the first storage means.

According to the present invention, the foregoing object is attained by providing an information processing system in which an image forming apparatus, a first information processing apparatus serving as a server and a second information processing apparatus serving as a client are connected via a network, wherein the first information processing apparatus has first registration means for registering a parameter sets in which multiple output parameters of the image forming apparatus are grouped, and first storage means for storing the parameter sets that have been registered by the first registration means; the second information processing apparatus has second registration means for registering a parameter sets, second storage means for storing the parameter sets that have been registered by the second registration means, and second selection means for selecting one of the parameter sets that have been stored in the first or second storage means; and the first information processing apparatus further has setting means for setting output parameters of the image forming apparatus based upon the parameter set that has been selected by the second selection means.

The first information processing apparatus further has registration control means for controlling registration by the second registration means.

The first information processing apparatus further has selection control means for controlling selection by the second selection means.

The selection control means controls the second selection means in such a manner that it is possible to select a parameter set solely from the first storage means.

The image forming apparatus further has first selection means for selecting any parameter set that has been stored in the first storage means, and the selection control means controls the second selection means in such a manner that it is possible to select only a parameter set that has been selected by the first selection means.

The first information processing apparatus and the second information processing apparatus have first and second display means, respectively, for displaying a graphical user interface, the first registration means performs registration and selection based upon the graphical user interface displayed on the first display means, and the second registration means performs registration and selection based upon the graphical user interface displayed on the second display means.

According to the present invention, the foregoing object is attained by providing an information processing method for managing parameter sets in which multiple output parameters of an image forming apparatus are grouped, comprising: a first acquisition step of acquiring a parameter sets from an administrator of the image forming apparatus; a second acquisition step of acquiring a parameter sets from an individual user of the image forming apparatus; a first storage step of storing in first storage means the parameter sets that have been acquired at the first acquisition step; a second storage step of storing in second storage means the parameter sets that have been acquired at the second acquisition step; a selection step of selecting one of the parameter sets from the first or second storage means; and a setting step of setting output parameters of the image forming apparatus based upon the parameter set that has been selected at the selection step.

The present invention further provides a computer-readable memory storing an information processing program for managing parameter sets in which multiple output parameters of an image forming apparatus are grouped, the information processing program including: a first acquisition program for acquiring the parameter sets from an administrator of the image forming apparatus: a second acquisition program for acquiring the parameter sets from an individual user of the image forming apparatus; a first storage program for storing in first storage means the parameter sets that have been acquired by the first acquisition program; a second storage program for storing in second storage means the parameter sets that have been acquired by the second acquisition program; a selection program for selecting one of the parameter sets from the first or second storage means; and a setting program for setting output parameters of the image forming apparatus based upon the parameter set that has been selected by the selection program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A to 5C are diagrams showing the content of a server profile database, the content of an individual profile database and a format of each record;

FIG. 21 is a diagram in which restrictions on operation in document properties are indicated by Levels 0-2; and FIG. 22 is a diagram showing a memory map of a storage medium which stores a data processing program and data.

DESCRIPTION OF THE PREFERRED EMBODIMENT

A preferred embodiment of the present invention will now be described in detail with reference to the drawings. It should be noted, however, that the relative placement of the structural elements, numerical values, etc., described in the embodiment does not limit the scope of the invention so long as there is no specific wording stating otherwise.

{Structure of the Apparatus}

Figure 1:
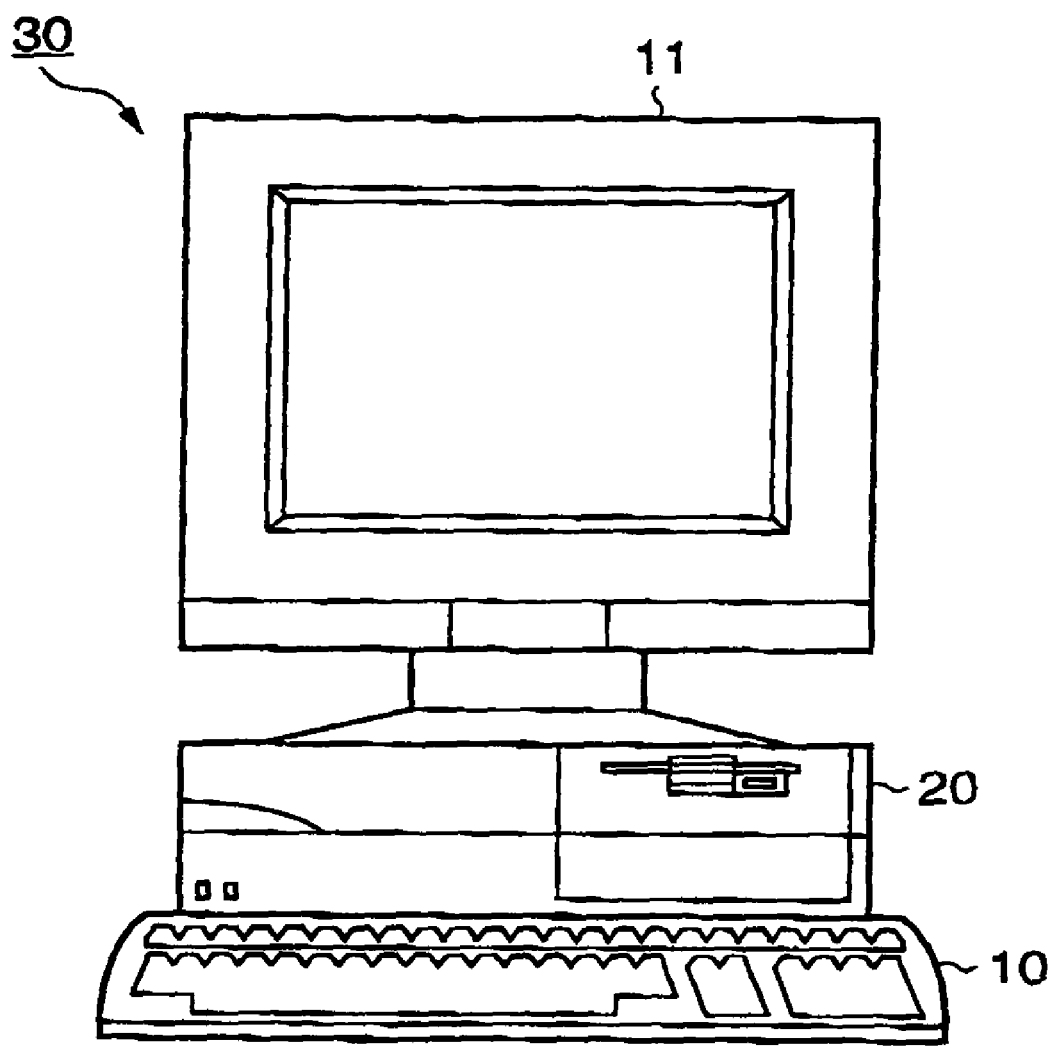
FIG. 1 is a diagram showing an external appearance of an information processing apparatus according to an embodiment of the present invention.

FIG. 1 is a diagram useful in describing the external appearance of an information processing apparatus according to an embodiment of the present invention.

Figure 3:
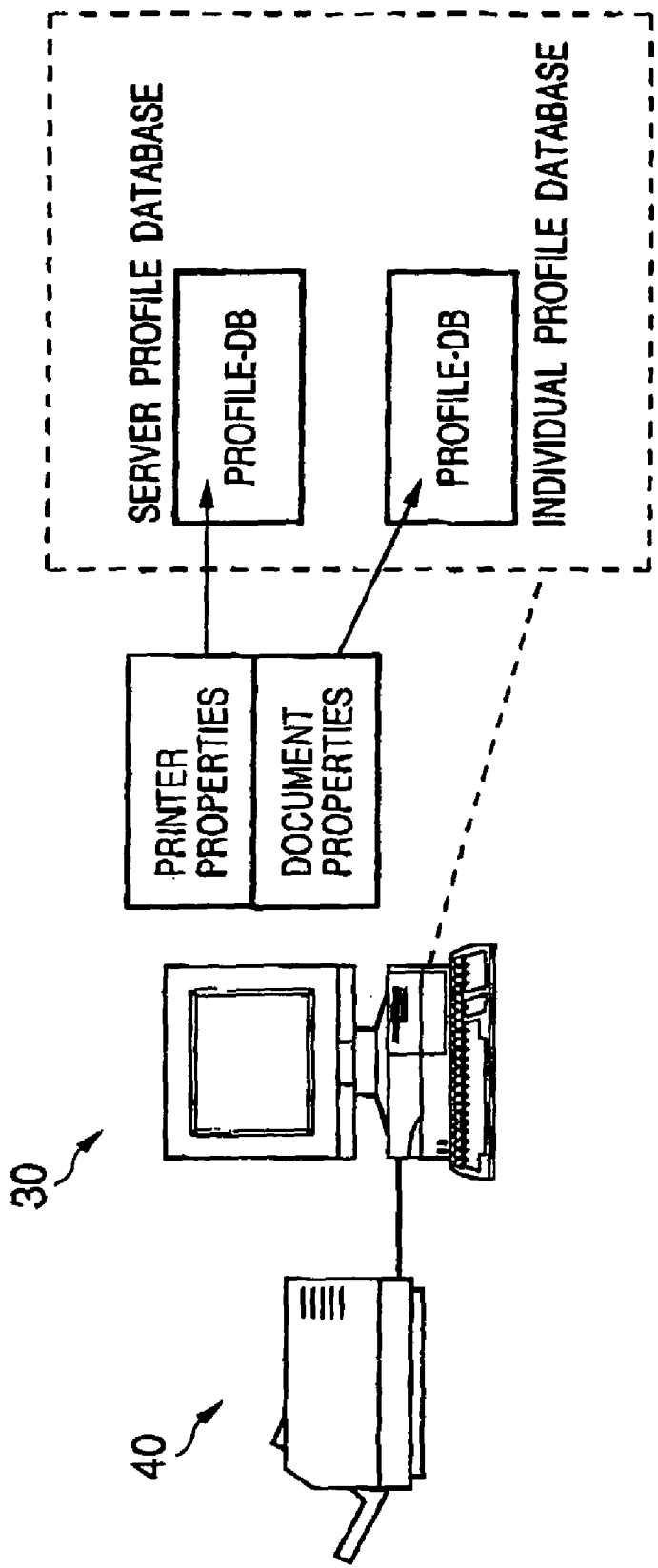
FIG. 3 is a diagram showing an arrangement of databases in a case where the information processing apparatus according to the embodiment of the present invention is used in a stand-alone environment.
Figure 4:
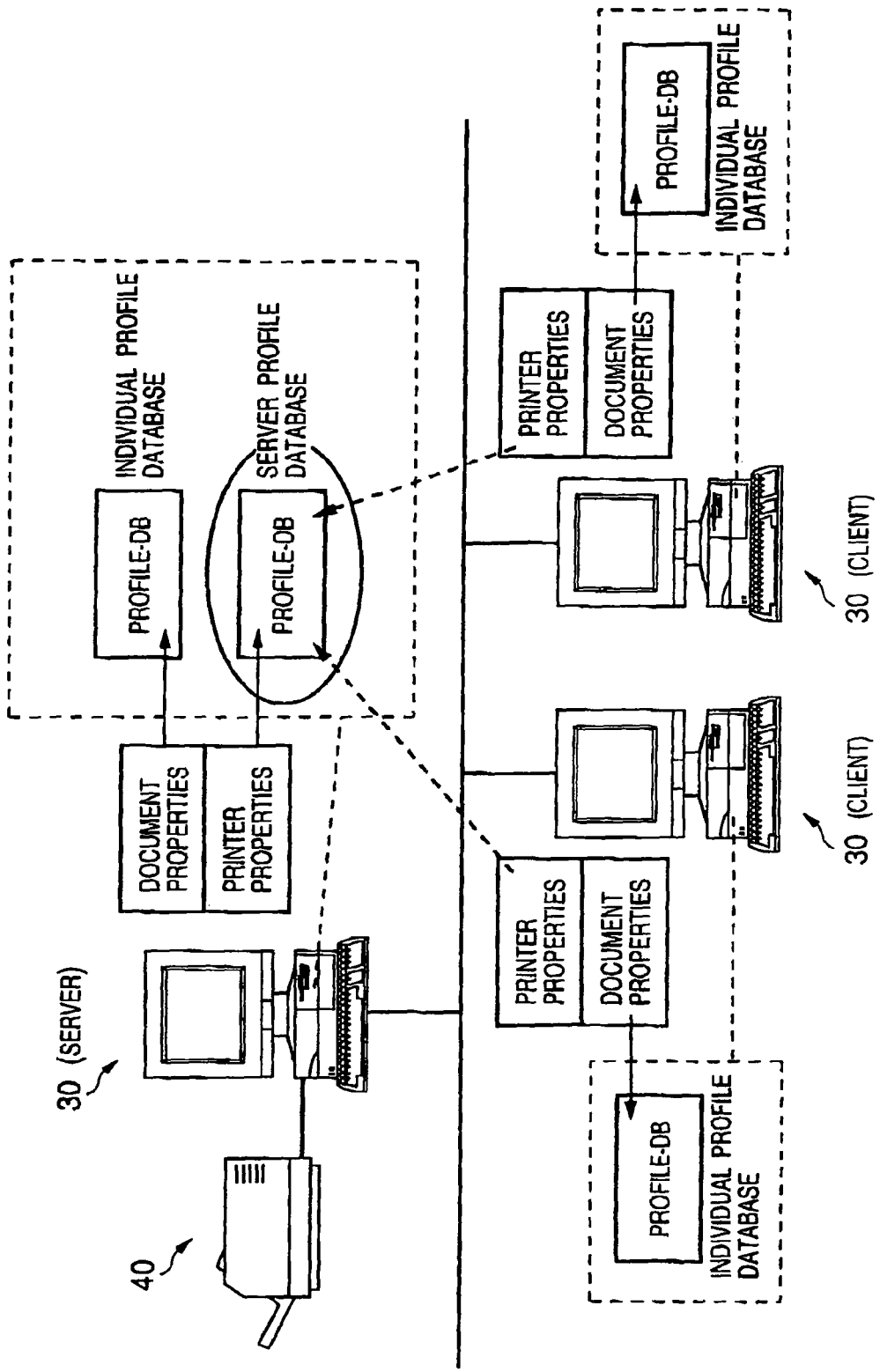
FIG. 4 is a diagram showing the arrangement of databases in a case where the information processing apparatus according to the embodiment of the present invention is used in a network environment.

A computer system 30 includes a host computer 20 and peripherals. The system includes a CRT display 11 and a keyboard 10. The information processing apparatus according to the present invention is not limited to the foregoing and it will suffice if the apparatus is constructed by a display, a data processing device (inclusive of a control board, hard disk, floppy-disk drive and CD-ROM drive) and an input unit (keyboard and a pointing device, which is not shown), which are generally possessed by a personal computer. As shown in FIGS. 3 and 4, the information processing apparatus is connected to a printer, which serves as the image forming apparatus, and is used to manage the printer 40.

Figure 2:
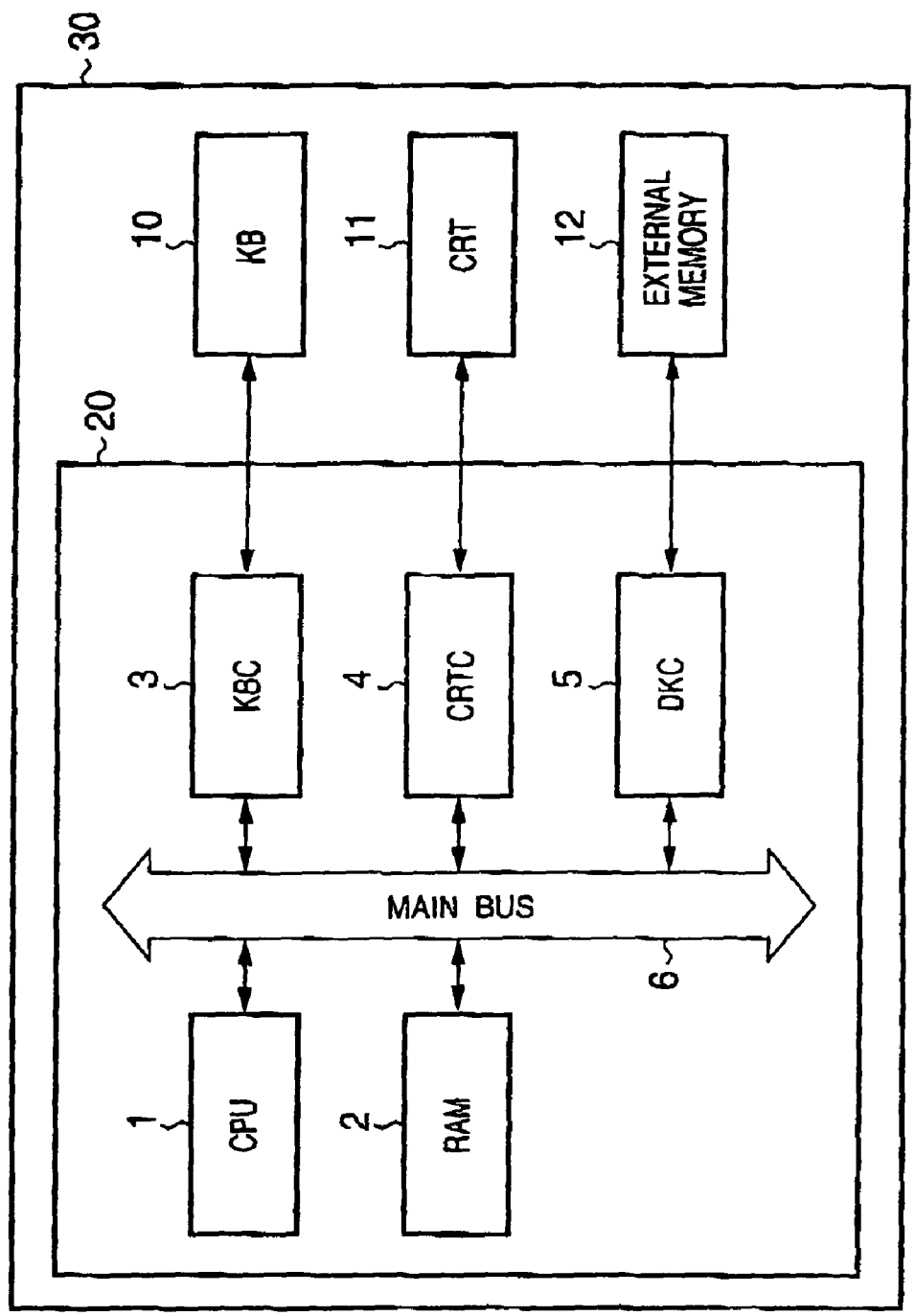
FIG. 2 is a diagram showing an internal structure of the information processing apparatus according to the embodiment of the present invention.

FIG. 2 is a block diagram useful in described the internal structure of the information processing apparatus.

The host computer 20 includes a CPU 1 for reading various programs, such as a control program, system program and application program, which have been read out of an external memory 12 via a disk controller (DKS) 5, out of a RAM 2 (described later), and for executing the programs to implement data processing of a variety of kinds. The disk controller 5 controls access to the external memory 12, such as a floppy disk, hard disk, CD-ROM, MD or MO, which stores a booting program, various applications and data files, etc.

The RAM 2, which is so adapted that its capacity can be expanded by optional RAM, not shown, functions mainly as a working area of the CPU 1. A keyboard controller (KBC) 3 controls inputs from the keyboard 10 and pointing device, which is not shown. A CRT controller (CRTC) 4 controls the display presented by the CRT display (CRT) 11. Numeral 6 denotes a main bus.

It should be noted that various information processing is executed by having the CPU 1 control the RAM 2, KBC 3, CRTC 4 and KDC 5 via the main bus 6 unless stated otherwise.

When detailed settings of an application or device driver are changed by opening a graphical user interface (GUI) in the system thus constructed, the system accepts user inputs from the keyboard 10 or pointing device (not shown) and displays the states of these inputs and the process in the form of a display screen on the CRT 11.

In this embodiment, it is assumed that the registration of favorites is performed in the RAM 2 or external memory 12 unless stated otherwise.

Figure 12:
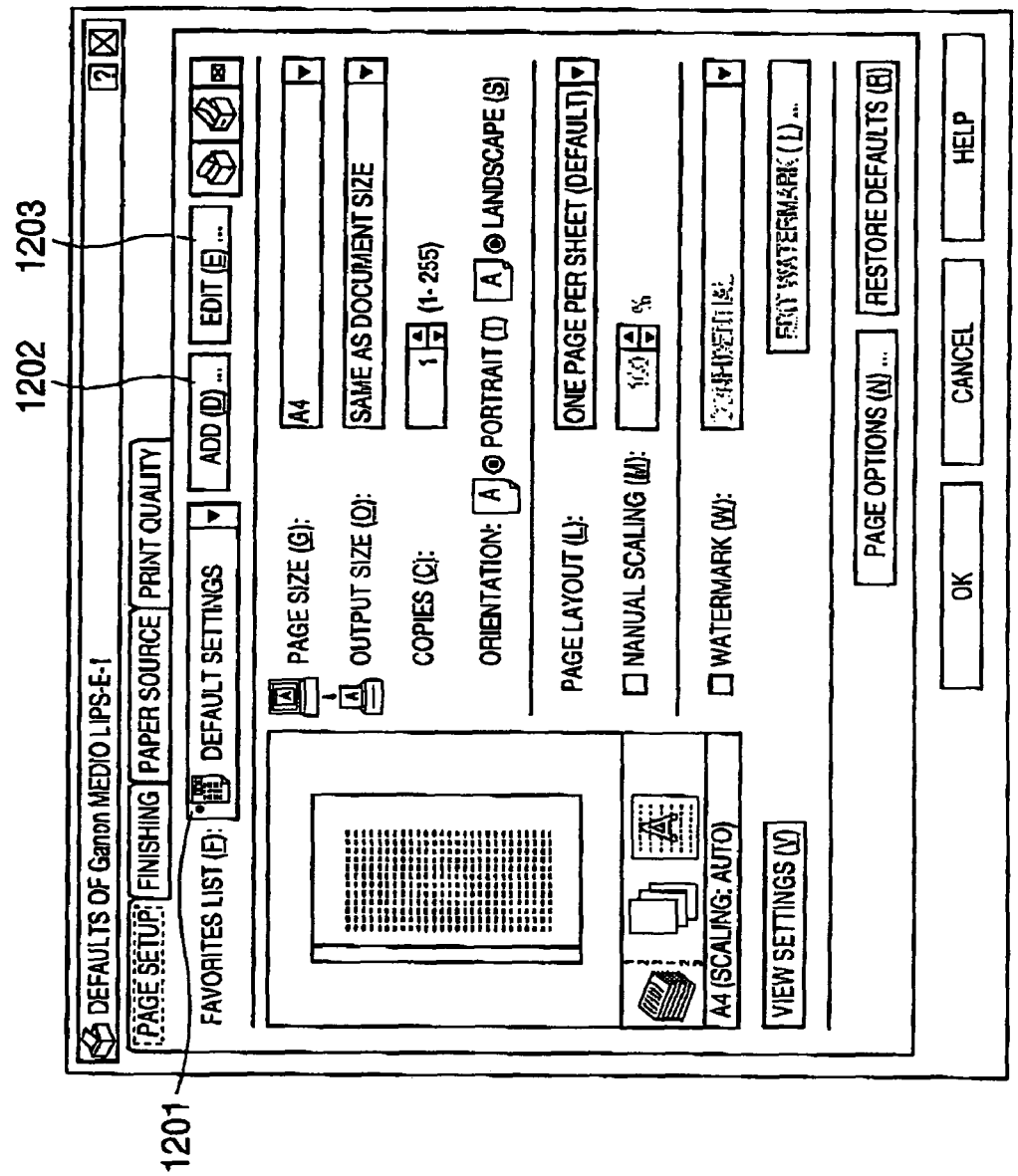
FIG. 12 is a diagram illustrating a Level-0 screen of a management sheet for managing favorite document properties.

A dialog screen of the kind shown in FIG. 12, for example, can be displayed on the CRT 11. By operating the keyboard 10 or pointing device while observing this dialog screen, it is possible to select and add to the overall registration data and to edit management information. A series of data configured by this overall registration function shall be referred to as "favorites".

This embodiment assumes that a print driver is one in compliance with Windows NT (registered trademark). There are two entrances that open the GUI, namely printer properties and document properties (which will be abbreviated as "PrnProp" and "DocProp", respectively). Basically, device options are set in the printer properties and the document to be printed is configured in the document properties.

The registration of favorites can be carried out from both the printer properties and document properties and mutually independent registration destinations (profile databases) are provided. The profile database for registration of the printer properties and the profile database of registration for the document properties shall be referred to as a "server profile database (DB)" and "individual profile database (DB)", respectively.

FIG. 3 shows the arrangement of profile databases in the case of a stand-alone environment. In this case, both profile databases are in the host computer. FIG. 4, on the other hand, shows an arrangement of profile databases in a case where a connection is made to a network. In this case, an individual profile database is in each host computer but only the server has the server profile database; the clients do not. In other words, access of the printer properties is made through the server profile database in the server. Accordingly, a client who does not possess privileges of the server can read information out of the server profile database but cannot change this information. A client who has privileges, can rewrite the information. Further, not only profile databases but all settings handled through the printer properties basically are in the possession of the server and this data is shared.

Favorites that have been registered in the server profile database are shared with all host computers inclusive of clients. The content of the server profile database is merged with the content of the individual profile database and the merged content is listed in the document properties. Content that is to be utilized can be selected from this merged content. It should be noted that what is actually configured to perform printing is in the document properties; the server profile database is strictly for performing only registration of items so that they can be used in the document properties.

FIG. 5A shows the content of a server profile database, FIG. 5B shows the content of an individual profile database and FIG. 5C shows the constitution of each record registered in the profile databases.

As shown in FIG. 5A, the server profile database comprises program defaults, in which several typical favorites have been registered, in advance, and those that have been registered by the users. The program defaults cannot be rewritten or deleted. An individual profile database, on the other hand, is initially blank or possesses only what has been registered by the user. Further, each registered record possesses management information such as a name and icon, etc., and actual data (detailed settings). The record is accessed using the name as the key.

[Overall Flow of Printer Properties]

Figure 6:
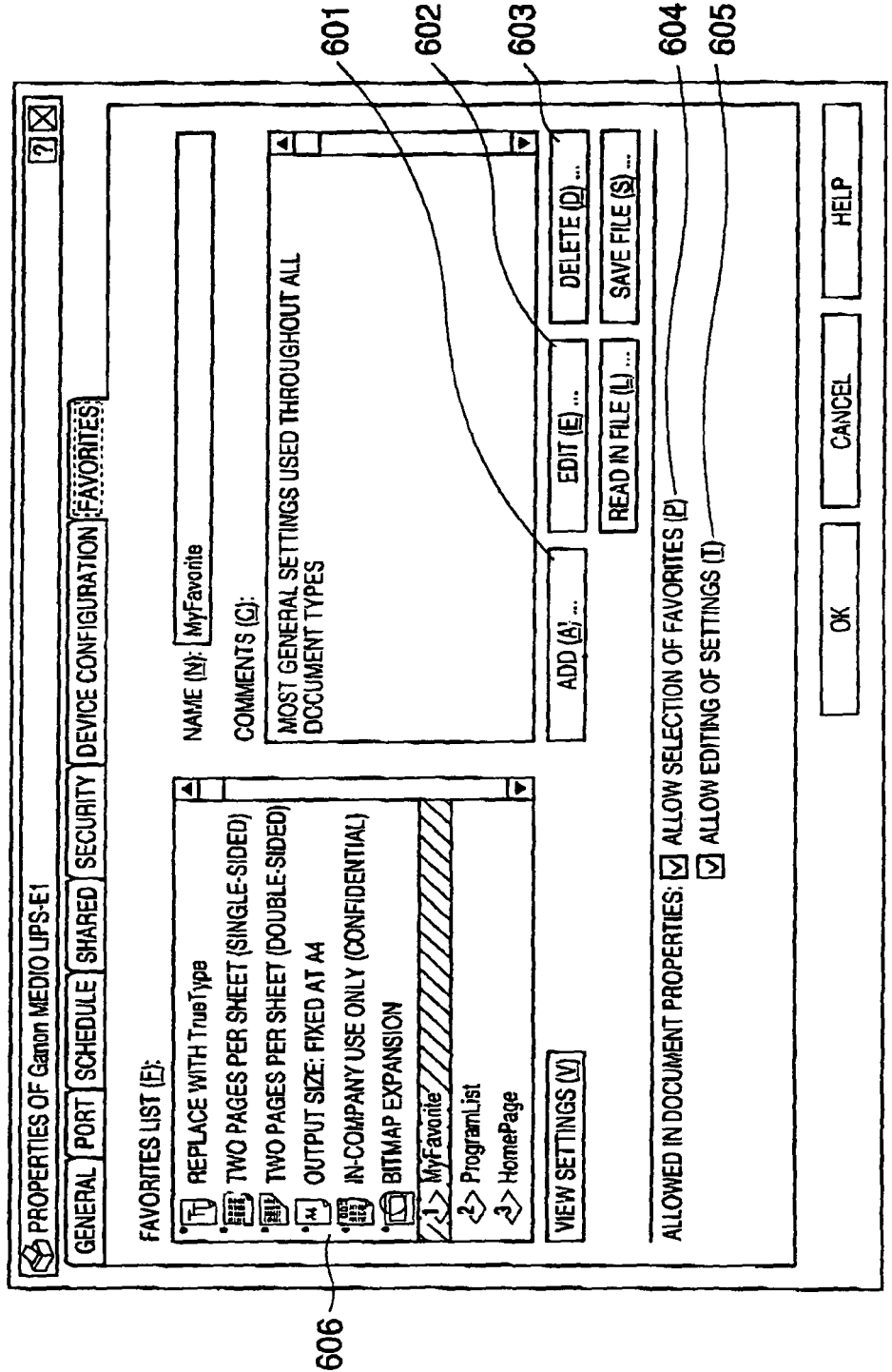
FIG. 6 is a diagram illustrating an example of a management-sheet screen for managing favorite printer properties.
Figure 7:
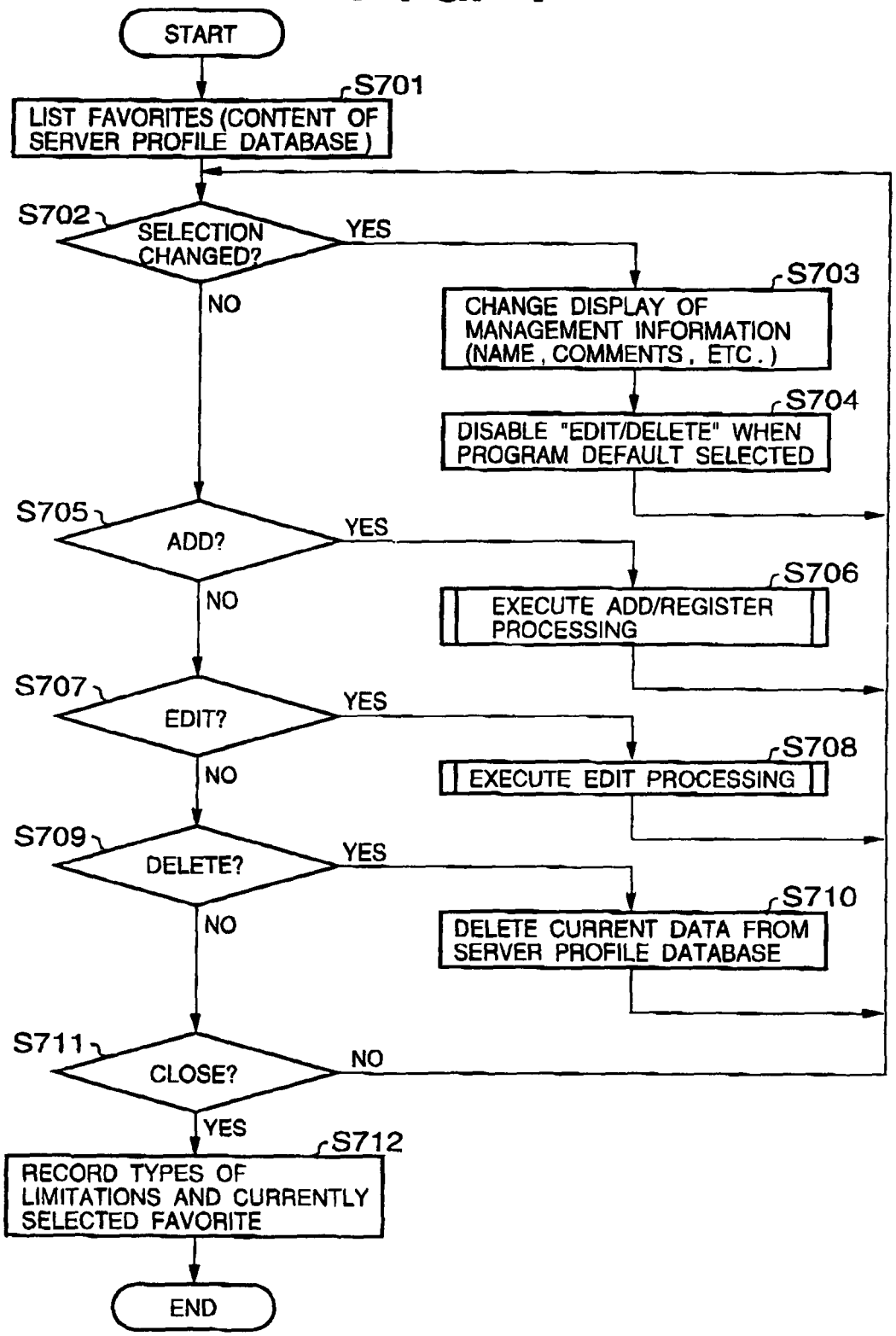
FIG. 7 is a flowchart illustrating processing for managing favorite printer properties.

The example of the dialog screen shown in FIG. 6 and the flowchart of FIG. 7 will be used to describe the flow of processing relating to all favorites of printer properties.

This dialog screen can be used to check the content of favorites, add new favorites, edit and delete favorites. First, at step S701, favorites are listed in an area 606 of FIG. 6 when a dialog box is displayed at step S701. The content listed comprises all favorites that have been stored in the server profile database, namely program defaults and user-registered printer properties. Noted that red-dot bitmaps, which are default marks, have been attached to the program defaults on the left side of the icons, whereas no such marks have been attached to what has been registered by the user. Further, any favorite is selected by default with the display of the dialog box, and management information that has been registered for this favorite is displayed in name and comment areas.

If a favorite selected in the list 606 is changed to another favorite at step S702, control proceeds to step S703, at which the display of management information (name, comments, etc.) that has been registered for the favorite is changed. When a program default is selected, an edit button 602 and a delete button 603 are disabled (S704). This is because the content of a program default cannot be changed.

Figure 8:
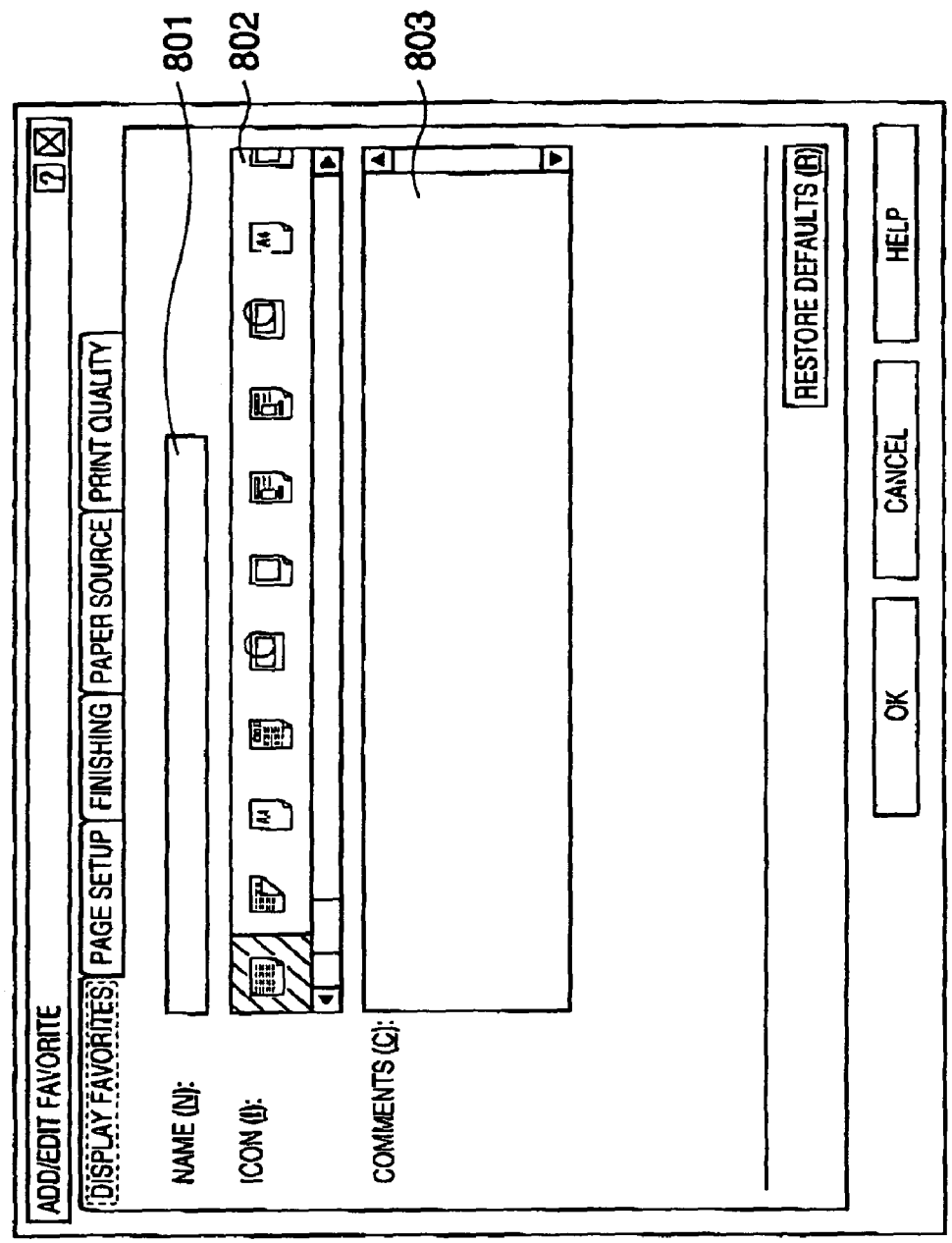
FIG. 8 is a diagram illustrating an example of an add/edit-sheet screen for adding to and/or editing favorite printer properties.

If an add button 601 is pressed at step S705, control proceeds to step S706, where the dialog screen shown in FIG. 8 is displayed and a series of processing steps relating to registration are executed. Similarly, if the edit button 602 is pressed, control proceeds to step S708, where the same dialog screen is displayed and a series of processing steps relating to editing of management information are executed. The details of this new registration processing and editing processing will be described later. If the delete button 603 is pressed at step S709, control proceeds to step S710, where the favorite that has been selected in the list 606 is deleted from the server profile database. The processing of steps S702 to S710 is executed until the dialog screen is closed at step S711.

Settings regarding whether or not check boxes 605, 605 have been checked are saved when the window is closed. These check boxes make it possible to set operation privileges when the document properties are opened. If a connection has been made to a network, these settings become effective for all clients dependent upon the server. In other words, an administrator can manage all clients merely by making settings at one server. In case of a setting that does not allow selection of a favorite, this setting is saved together with the name of the favorite that has been selected in the list 606.

{Flow for Adding to and/or Registering Printer Properties}

Figure 9:
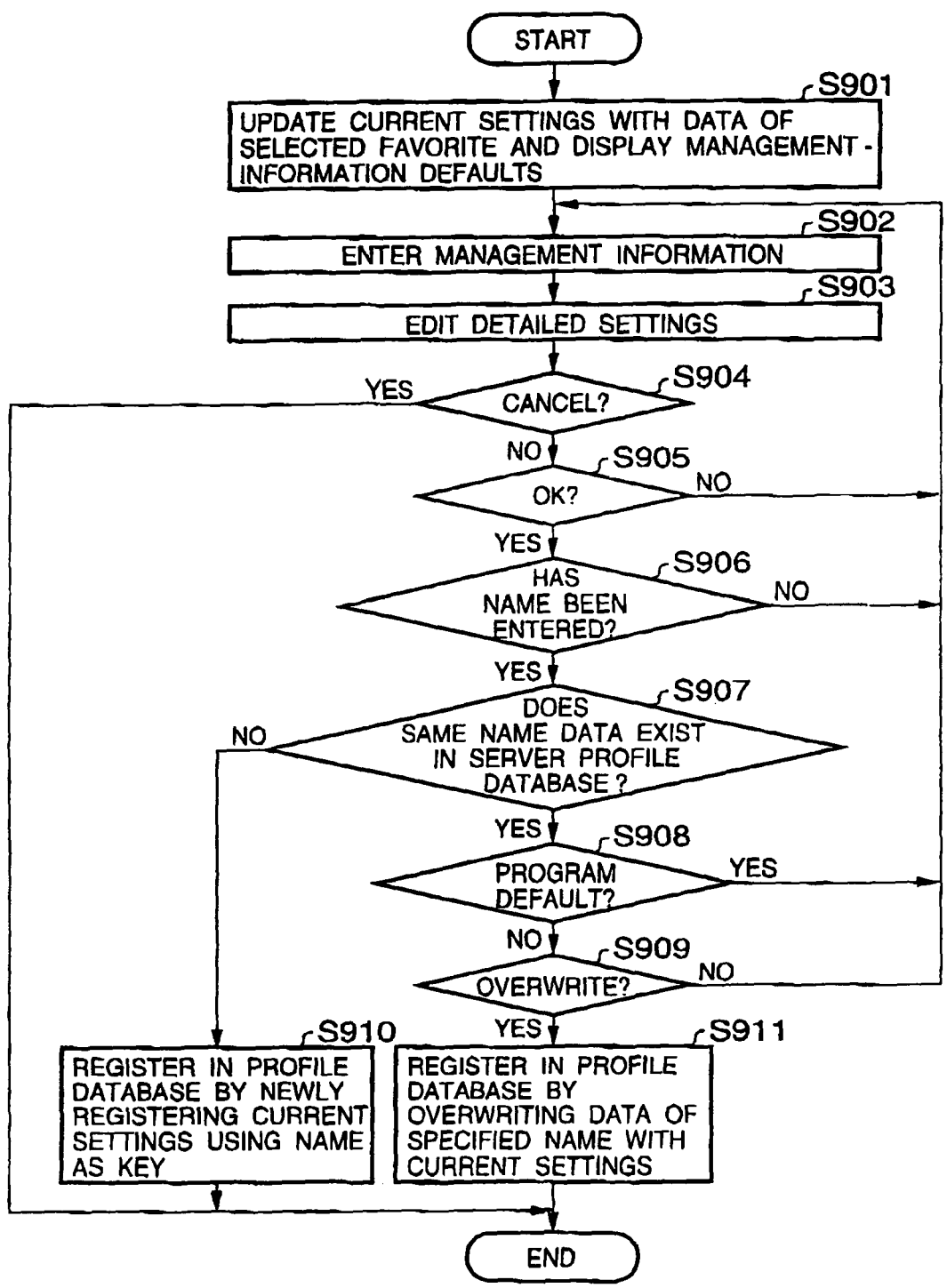
FIG. 9 is a flowchart illustrating processing for registering favorite printer properties.

A series of processing steps relating to registration of favorites at step S706 will be described with reference to the example of the dialog screen shown in FIG. 8 and the flowchart of FIG. 9. This dialog screen makes it possible to configure management information such as names, icons and comments. Property sheets are displayed and so are detailed settings actually registered from a second sheet onward.

First, the present properties sheet for additions and editing is opened at step S901. When this is done, sheets from the second sheet onward are initialized according to the set content that has been registered for the favorite selected in the favorites list 606 in FIG. 6, and management information areas 801 to 803 in FIG. 8 are initialized according to the default settings. The default settings consist of a blank name area and a blank comment area and selection of the leftmost icon.

After the user makes entries in the management information areas 801 to 803 at step S902, control proceeds to S903, where the detailed settings are edited. If a cancel button is pressed at step S904, no further processing is executed and the program exits. If an OK button is pressed at step S905, registration processing is started. It is then determined at step S906 whether or not a name has been entered. If the answer is "NO", then the user is prompted to make the entry again. Since the name is the key for managing favorites, its entry is essential. Next, it is determined at step S907 whether or not the specified name is a duplicate of data that already exists. If identical name data does not exist, then control proceeds to step S910, where the specified name is used as a key to newly register the current settings in the server profile database. If it is found at step S907 that identical name data already exists, then control proceeds to step S908. If this name is the same as that of a program default, control returns to step S902 and it becomes necessary to change the entered name. If the name is not that of a program default, control proceeds to step S909. Here it is determined whether or not to overwrite the existing name. If the existing name is to be overwritten, control proceeds to step S911. Here the existing data in the server profile database is overwritten. If overwrite is not to be performed, the user enters a name again. All setting items from the second sheet onward are the object of registration.

The above-described processing continues until the OK or cancel button is pressed. The properties sheet is closed at the end of processing.

{Flow for Editing Printer Properties}

Figure 10:
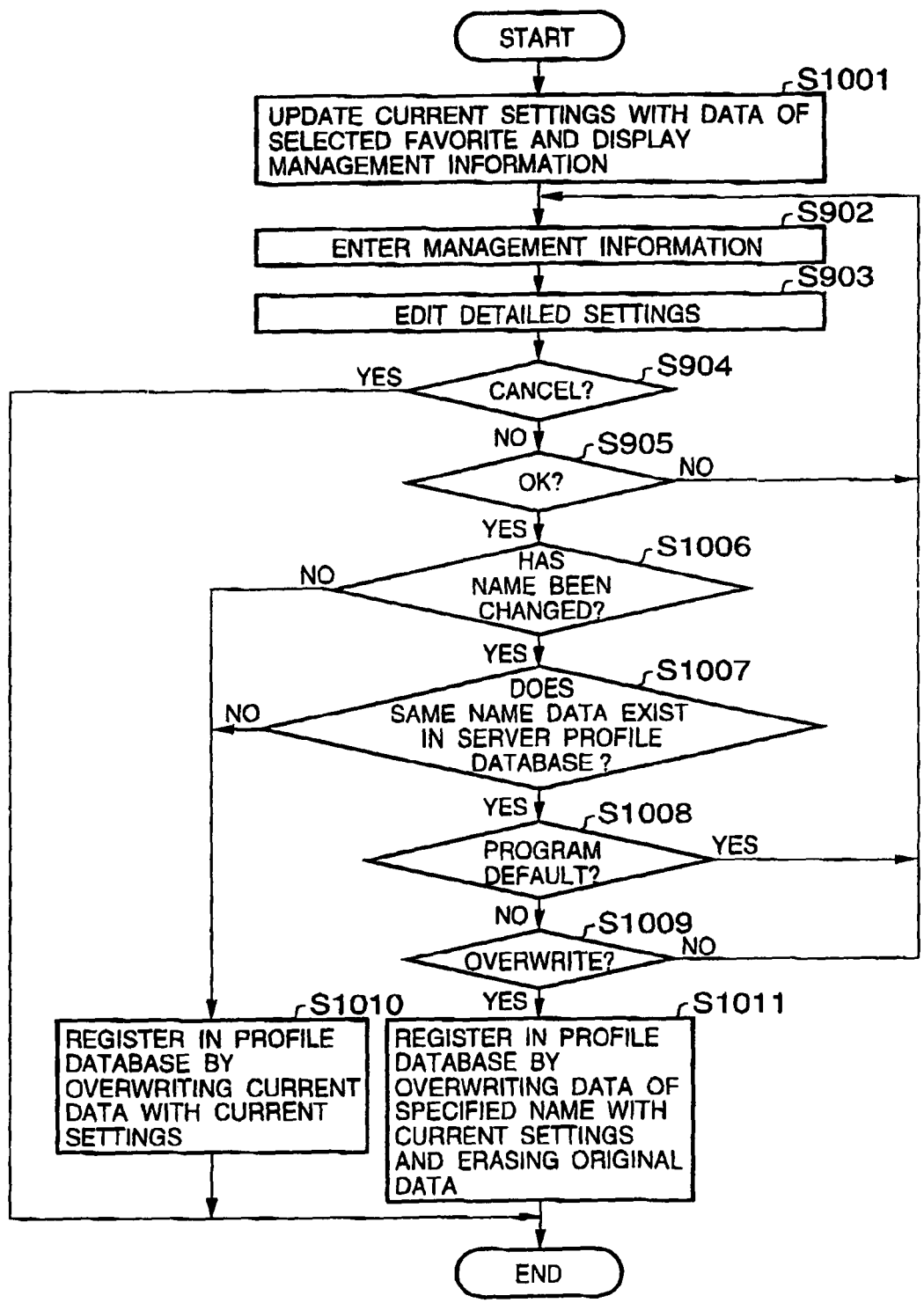
FIG. 10 is a flowchart illustrating processing for editing favorite printer properties.

A series of processing steps relating to editing of favorites set forth at step S708 in the flowchart of FIG. 7 will be described with reference to the flowchart of FIG. 10. It should be noted that since this processing is substantially the same as the addition/registration flow set forth in FIG. 9, steps which exactly the same processing is executed are designated by like reference characters and have not been described again.

Figure 11:
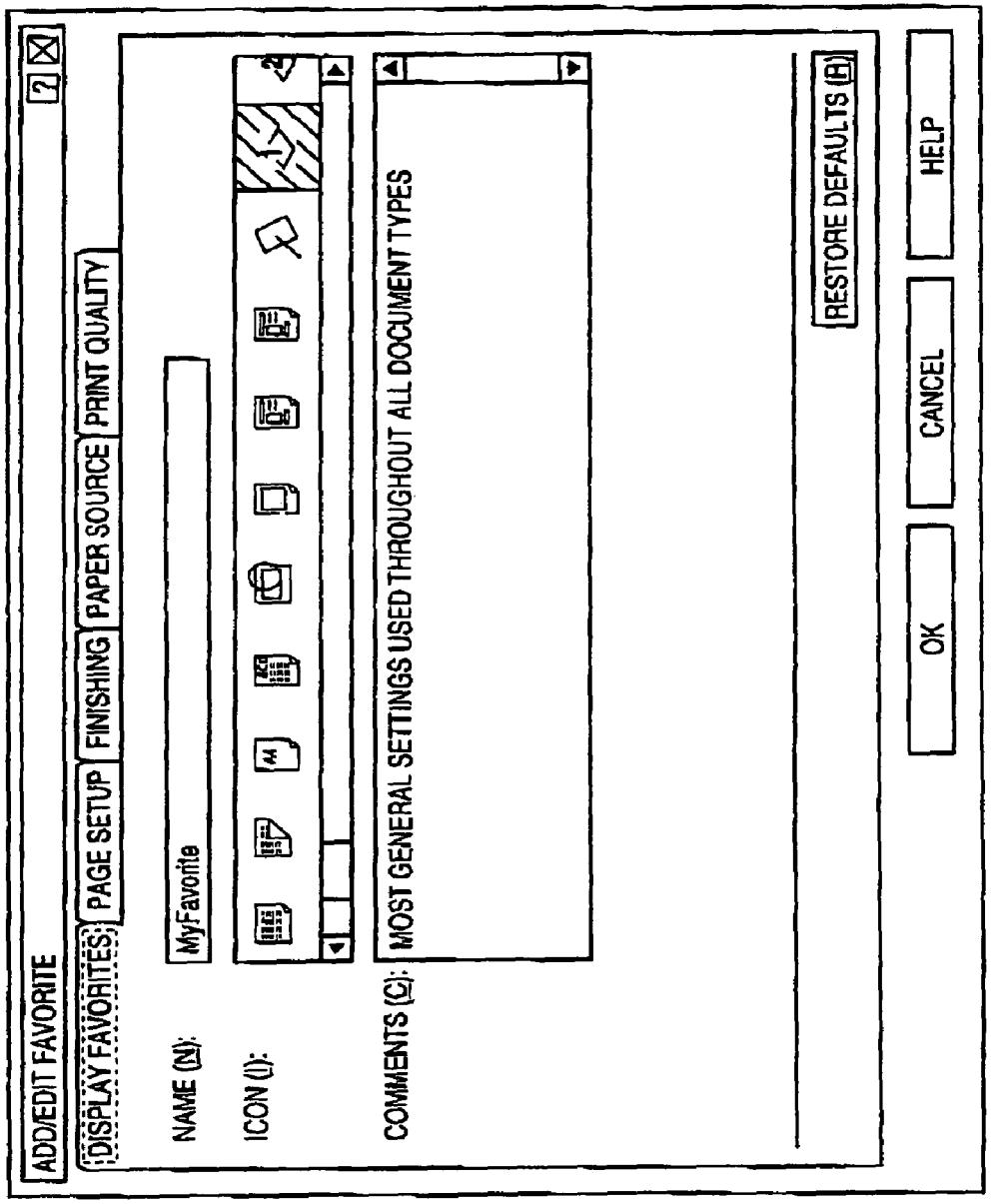
FIG. 11 is a diagram illustrating an example of an add/edit-sheet screen for adding to and/or editing favorite printer properties.

First, when a properties sheet is displayed, detailed settings from the second sheet onward are initialized in the same manner as performed in the addition/registration operation. At step S1001, however, the management information of the first sheet also is initialized according to the attributes registered for the favorite serving as the base. FIG. 11 illustrates an example of the dialog screen when the properties sheet is opened.

When registration is made in the server profile database by pressing the OK button, the favorite that has been selected is overwritten (step S1010) in a case where the name has not been changed ("NO" at step S1006) or in a case where the name has been changed but is not a duplicate of already existing name data ("NO" at step S1007). If the result of changing the name is data identical with already existing name data ("YES" at step S1007) and this name is identical with a program default ("YES" at step S1008), then it cannot be registered. If the changed name is identical with existing name data but this name is not identical with a program default ("NO" at step S1008), then whether or not overwrite is to be preformed is confirmed at step S1009. If the answer is "YES", then the duplicate data is overwritten and the original favorite is erased (step S1011).

{Overall Flow of Document Properties}

The flow of processing relating to favorites overall will be described with reference to the example of the dialog screen shown in FIG. 12 and the flowchart of FIG. 13.

This dialog screen makes it possible to change detailed settings and to select favorites. First, when a dialog box is displayed, favorites are listed in a favorites area 1201 and each control is initialized (S1301). The content of the list depends upon settings (the check boxes 604, 605 in FIG. 6) relating to "ALLOWED IN DOCUMENT PROPERTIES" in the printer properties. The operation, dependence upon the "ALLOWED IN DOCUMENT PROPERTIES" settings, will be described with reference to FIG. 21.

Figure 14:
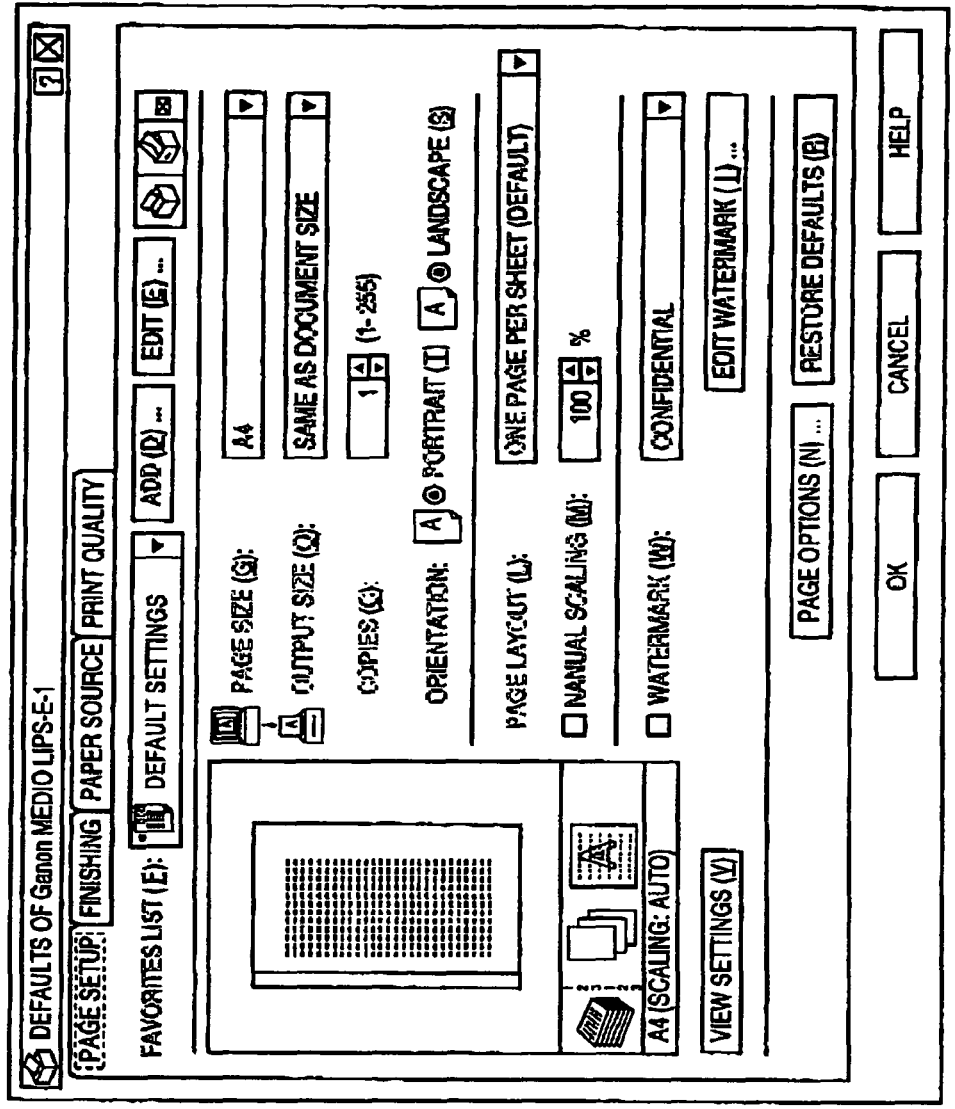
FIG. 14 is a diagram illustrating a Level-1 screen of a management sheet for managing favorite document properties.
Figure 15:
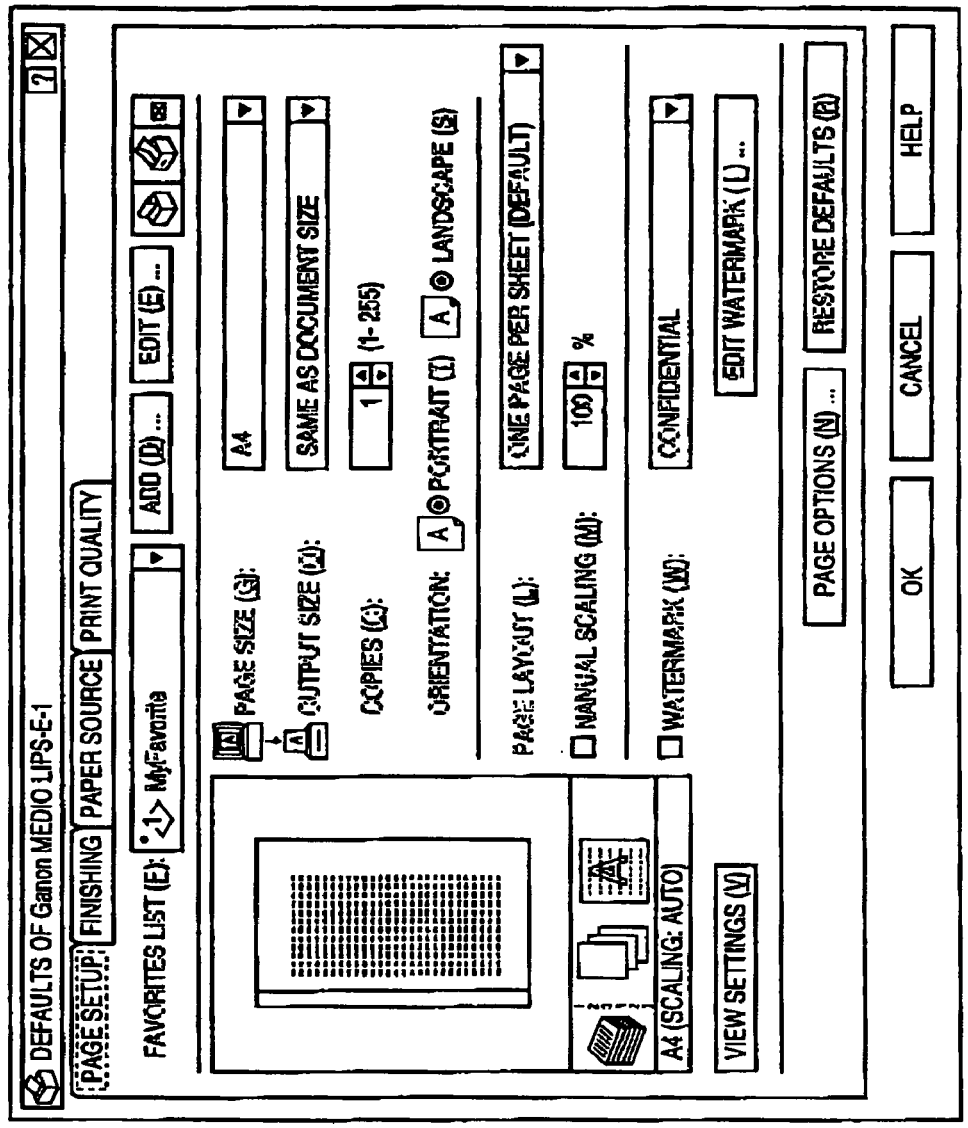
FIG. 15 is a diagram illustrating a Level-2 screen of a management sheet for managing favorite document properties.

In the case of Level 0, all controls are enabled, as shown in FIG. 12. In the case of Level 1, only the favorites section 1201 is enabled; all other controls are disabled, as shown in FIG. 14. In the case of Level 2, all controls are disabled, as shown in FIG. 15.

If the current selection is changed in the favorites section 1201 (S1303), the selected attribute information from "Favorites" that has been registered in the profile database is acquired and is reflected in the current settings of the document properties (S1304). If what has been selected is a favorite in the printer properties, then the favorite of the applicable name is acquired from the server profile database. If what has been selected is a favorite in the document properties, then the favorite of the applicable name is acquired from the individual profile database. The controls of all sheets are changed by the acquired current settings in accordance with the new settings (S1305).

Figure 16:
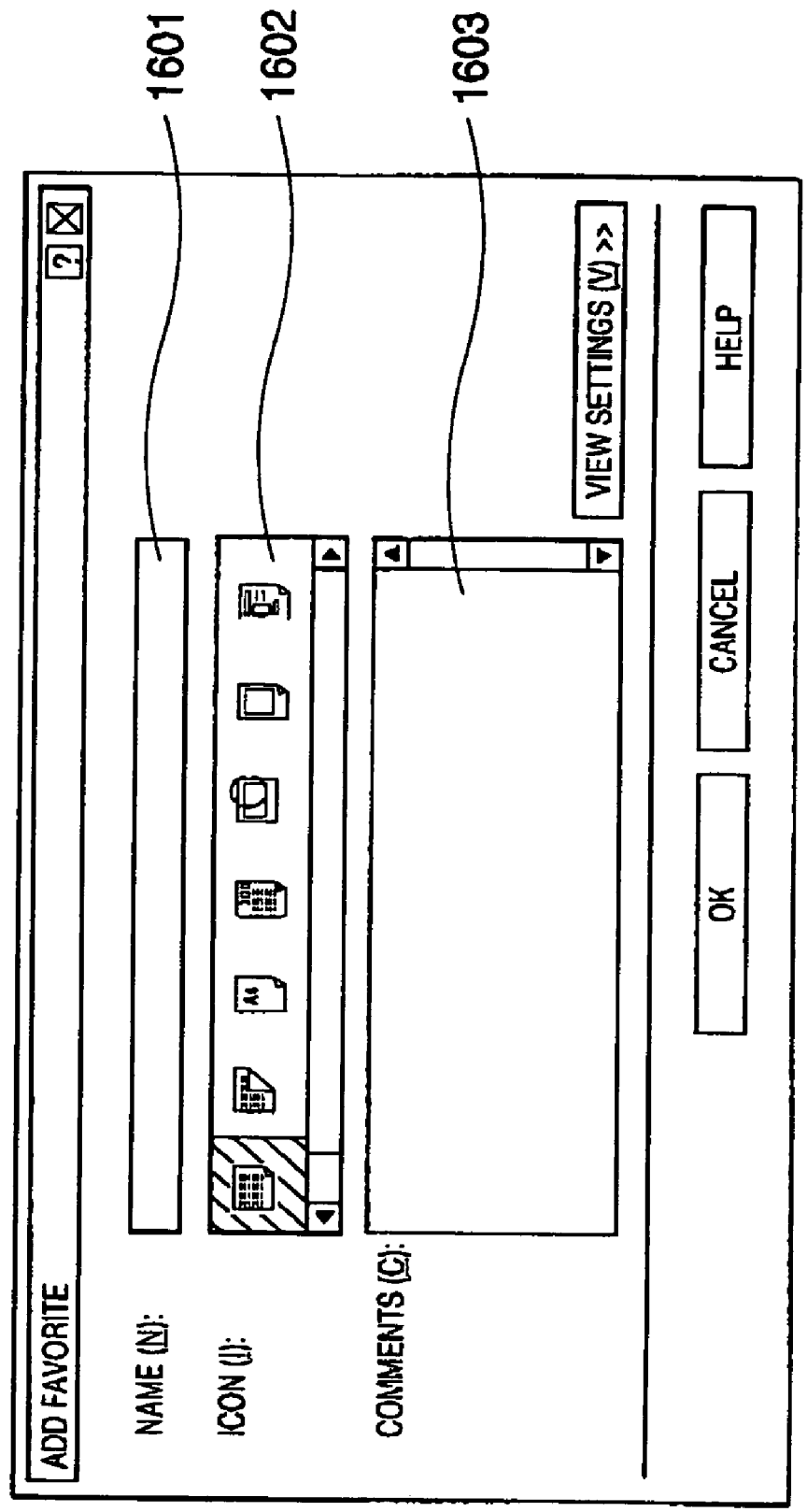
FIG. 16 is a diagram illustrating an example of an addition dialog screen for adding to favorite document properties.
Figure 18:
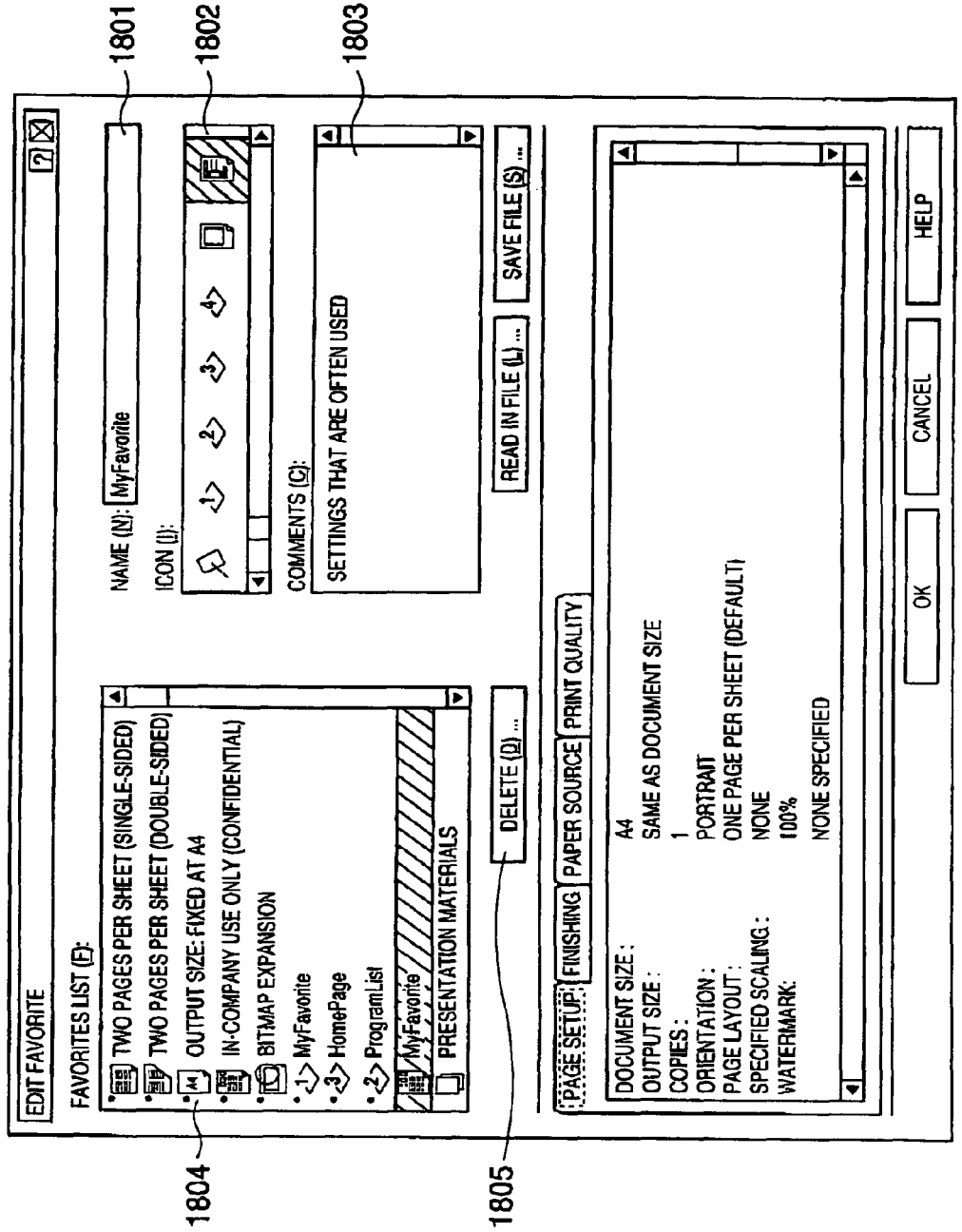
FIG. 18 is a diagram illustrating an example of an editing dialog screen for adding to favorite document properties.

If an add button 1202 is pressed (S1306), the dialog screen shown in FIG. 16 is displayed, a series of processing steps relating to registration are executed (S1307) and the display of the favorites section 1201 is updated in such a manner that the newly registered name is made the current name (S1308). If an edit button 1203 is pressed, then the dialog screen shown in FIG. 18 is displayed and a series of processing steps relating to editing of management information are executed (S1310). These processing steps are executed until the dialog screen is closed (S1311).

By way of example, the items indicated below are current settings mentioned at step S1304. These are input/output paper size, paper orientation, number of copies, page layout (Nup, poster, etc.), enlargement ratio, watermark, overlay, printing method (single-sided, double-sided, booklet), details of booklet printing, binding direction, binding gutter, paper-discharge method (sort, stable, etc.), stapling position, paper-feed method (identical feed of all pages, different paper feed for first and last pages, etc.), paper name, printing objective, resolution, color setting, etc.

{Flow for Adding to and/or Registering Document Properties}

Figure 17:
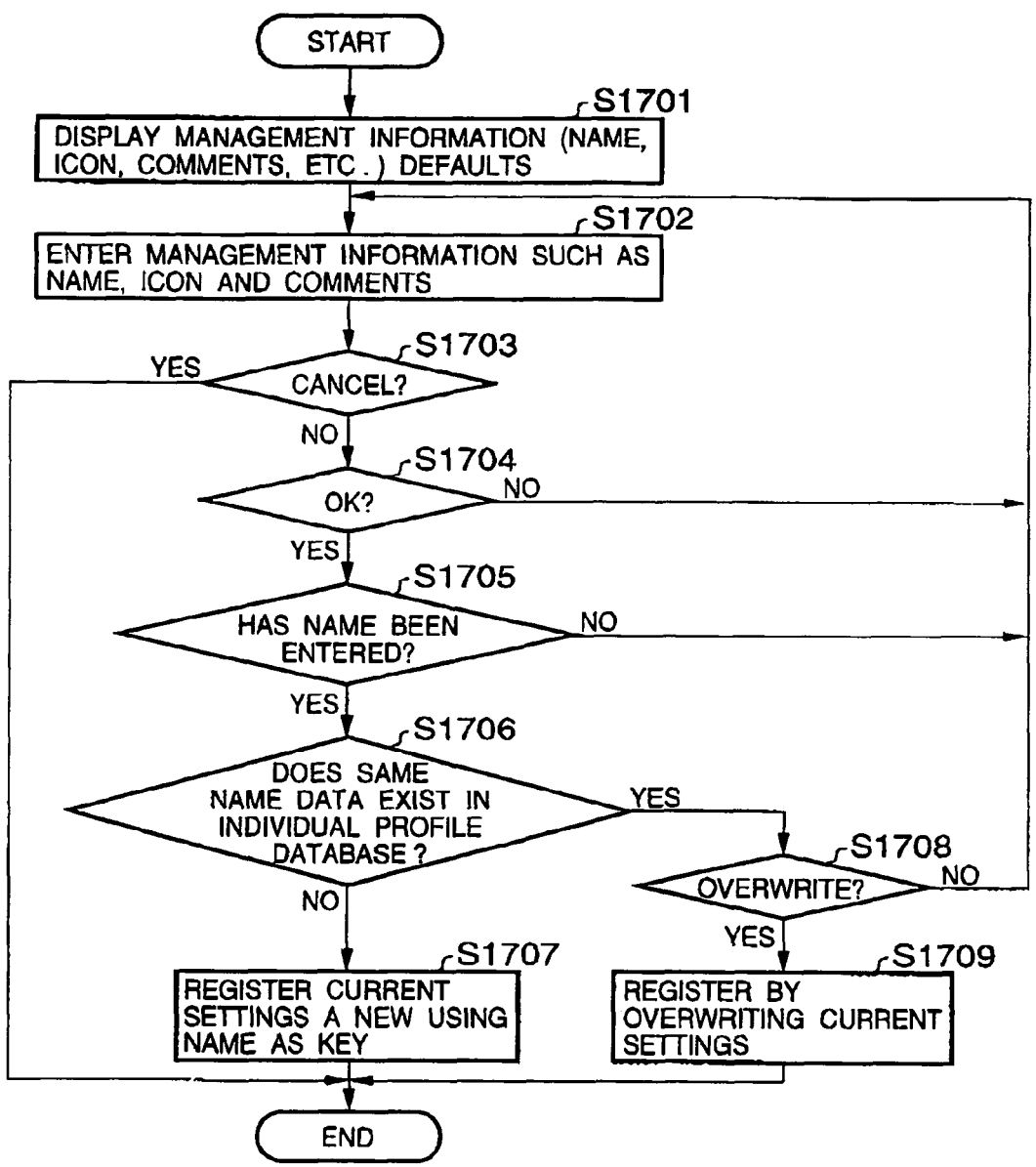
FIG. 17 is a flowchart illustrating processing for adding to favorite document properties.

A series of processing steps relating to registration of favorites mentioned at step S1307 in FIG. 13 will be described with reference to the example of the dialog screen shown in FIG. 16 and the flowchart of FIG. 17. This dialog screen makes it possible to configure management information such as names, icons and comments.

First, the dialog screen for addition/registration is opened. Management-information input area 1601-1603 are updated by the default settings at this time (S1701). The default settings are a blank name area and a blank comment area and selection of the leftmost icon.

Next, the system waits for an input of management information from the user at step S1703. If the cancel button is pressed at step S1704, no further processing is executed and the program exits. If the OK button is pressed at step S1704, control proceeds to step S1705 and registration processing is started. First, it is determined at step S1705 whether or not a name has been entered. If the answer is "NO", then the user is prompted to make the entry again. Since the name is the key for managing favorites, its entry is essential. Next, it is determined at step S1706 whether or not the specified name is a duplicate of data that already exists in the individual profile database. If identical name data does not exist, then control proceeds to step s1707, at which the specified name is used as the key to newly register the current settings in the individual profile database. If it is found at step S1706 that identical name data already exists, then control proceeds to step S1708. Here it is determined whether or not to overwrite the existing name. If the existing name is to be overwritten, control proceeds to step S1709 and the applicable data in the profile database is overwritten. If overwrite is not to be performed, the user enters a new name. Basically, all items on the properties sheet of FIG. 12 are the object of registration.

The above-described processing continues until the OK or cancel button is pressed. The dialog screen is closed at the end of processing.

{Flow for Editing Document Properties}

A series of processing steps relating to editing of favorites set forth at step S1310 in the flowchart of FIG. 13 will be described with reference to the example of the dialog screen shown in FIG. 18 and the flowchart of FIG. 19. This dialog screen makes it possible to check the content of favorites and to edit and delete management information.

When the button 1203 in FIG. 12 is pressed, a dialog screen shown in FIG. 18 for editing management information is opened and favorites are listed in a list 1804 of favorites at step S1901. The listed content will be described later. When this dialog screen is opened, a state in which one of the favorites in the area 1804 has been selected is attained. For example, the dialog screen opens with the favorite indicated in area 1201 of FIG. 12 having been selected.

Each control is initialized according to the attributes that have been registered for the favorite selected in the list of favorites in area 1804. If the area of the favorite is changed at step S1902, management information (name, icon, comments, etc.) is updated at step S1903. This is followed by step S1904. If the selected favorite has been registered in the server profile database, management information areas 1801-1803 and a delete button 1805 are disabled so that the user cannot perform editing. If the selected favorite has been registered in the individual profile database, then all controls are enabled. It should be noted that listed favorites that are present in the server profile database are identified by default marks (red-dot bitmaps) so that they can be distinguished visually.

Next, the user is capable of editing management information at step S1905. In a case where the delete button 1805 is pressed at step S1906, control proceeds to step S1907 and the favorite that has been selected in the list is deleted from the individual profile database.

If the dialog screen is closed at step S1908, control proceeds to step S1909. If the setting is changed, processing is executed in such a manner that the setting after the change is left in the individual profile database. More specifically, if a specified name after a change duplicates another existing setting, it is determined at step S1911 whether or not overwrite is to be performed. If the answer is "YES", the changed data is registered in place of the already existing data at step S1912. If the answer is "NO", the user is prompted to make an input again. If it is found at step S1910 that identical name data does not exist, then registration is performed by overwriting the data undergoing editing. The dialog screen closes at the end of processing.

{Flow for Listing Favorites in Document Properties}

Reference will be made to the flowchart of FIG. 20 to describe a series of processing steps relating to listing of favorites at step S1301 in the flow of FIG. 13 and step S1901 in the flow of FIG. 19. The favorites that can be used are listed in a list box in this flow.

There are three types of favorites for which there is a possibility of listing, namely "program defaults" and "user-registered printer properties", which have been registered in the server profile database, and "user-registered document properties", which have been registered in the individual profile database.

Combinations listed depend upon settings (the check boxes 604, 605 in FIG. 6) relating to "ALLOWED IN DOCUMENT PROPERTIES" in the printer properties of FIG. 6, namely types of limitations recorded at step S712 in FIG. 7. Since the types of limitations are the three shown in FIG. 21, these will be described using the levels in FIG. 21.

In case of Level 0 (both ON), reference is made to both the server profile database and individual profile database and all program defaults, user-registered printer properties and user-registered document properties are listed. In case of Level 1 (selection ON and editing OFF), only the content of the server profile database, namely the program defaults and the user-registered printer properties, is listed (S2004). In case of Level 2 (both OFF), only the selected favorite in the printer properties is listed (S2005). When listing is performed, the default marks (the red-dot bitmaps) are attached to the program defaults and user-registered printer properties (S2006).

Figure 13:
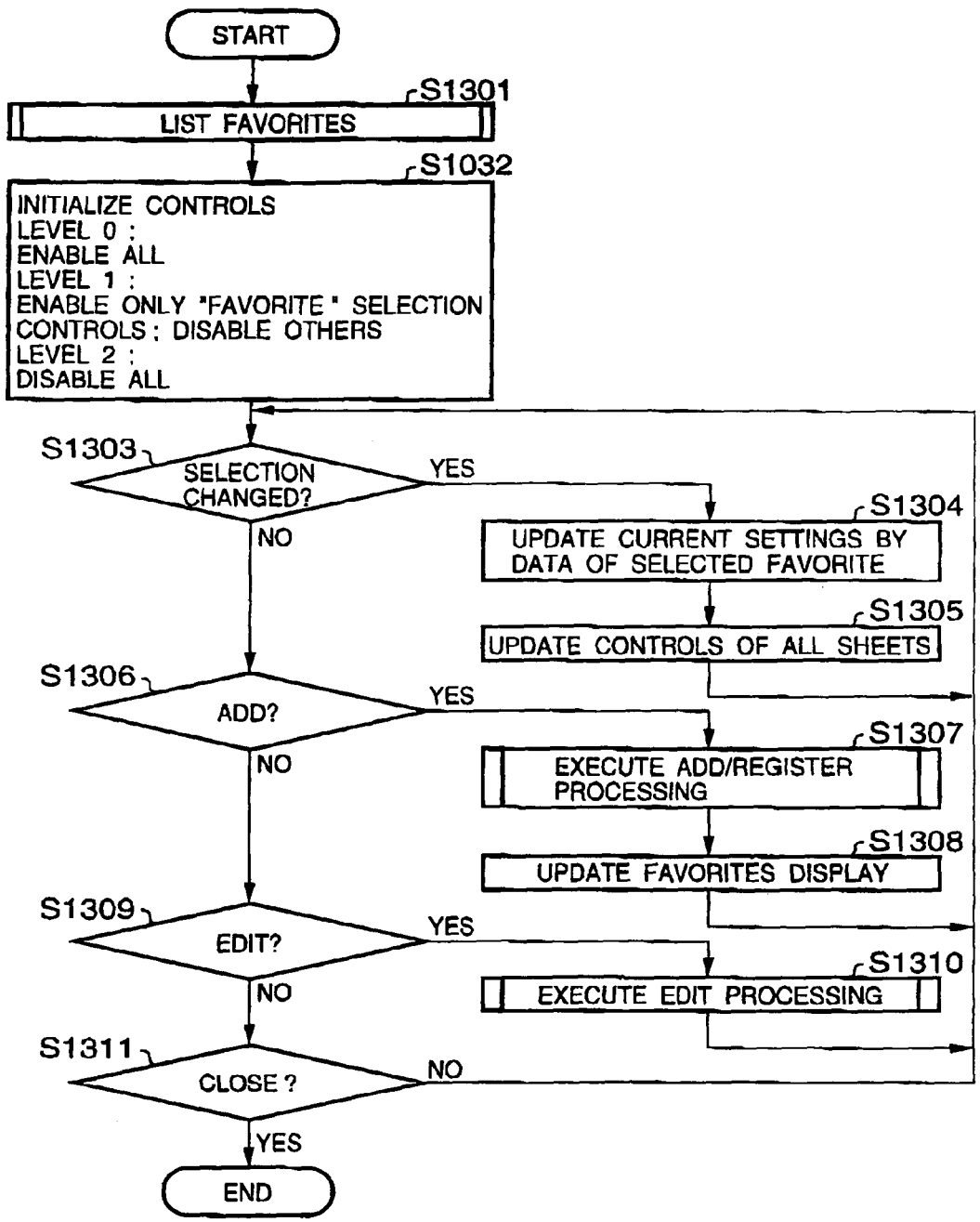
FIG. 13 is a flowchart illustrating processing for managing favorite document properties.
Figure 19:
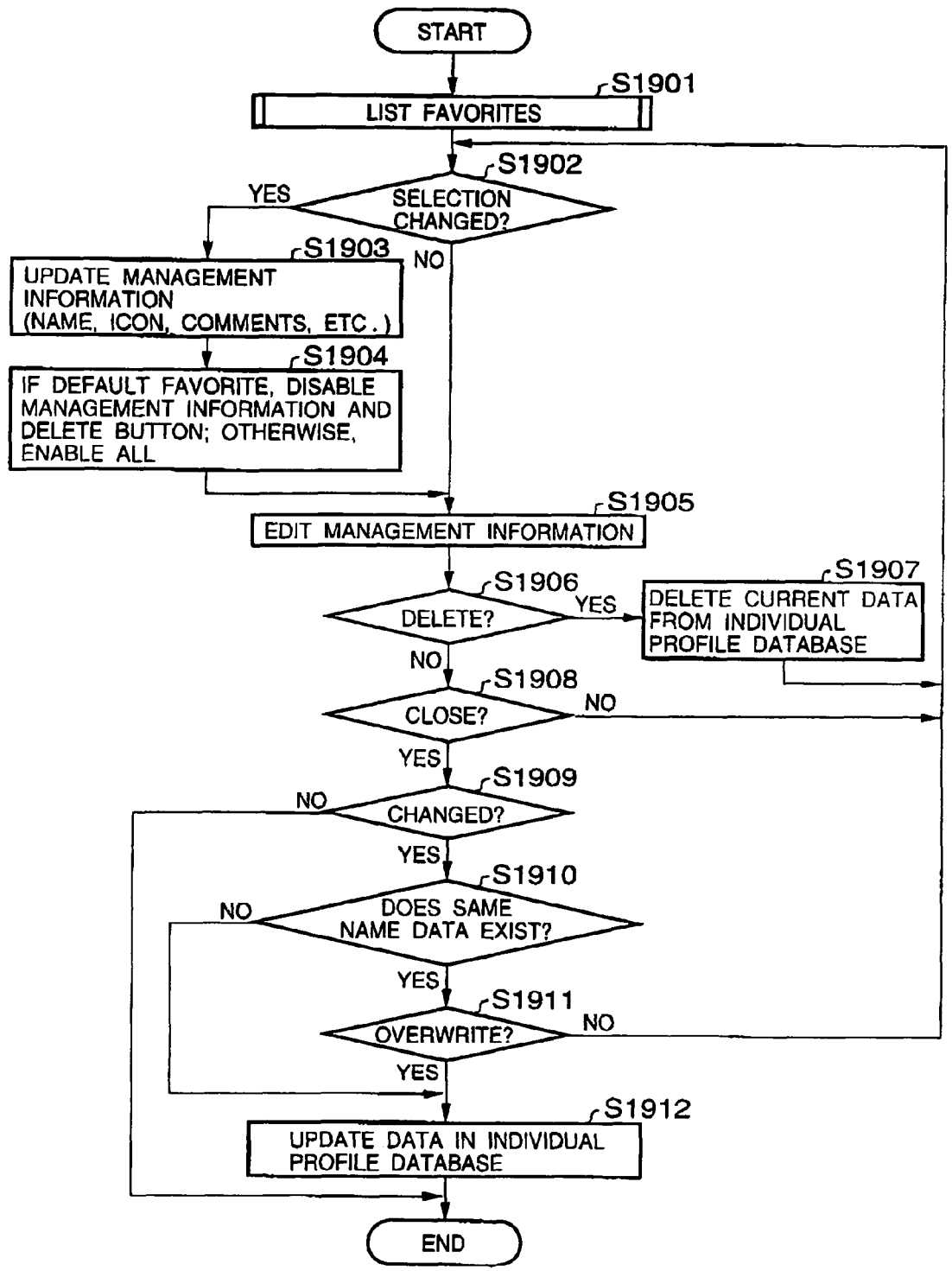
FIG. 19 is a flowchart illustrating processing for editing favorite document properties.
Figure 20:
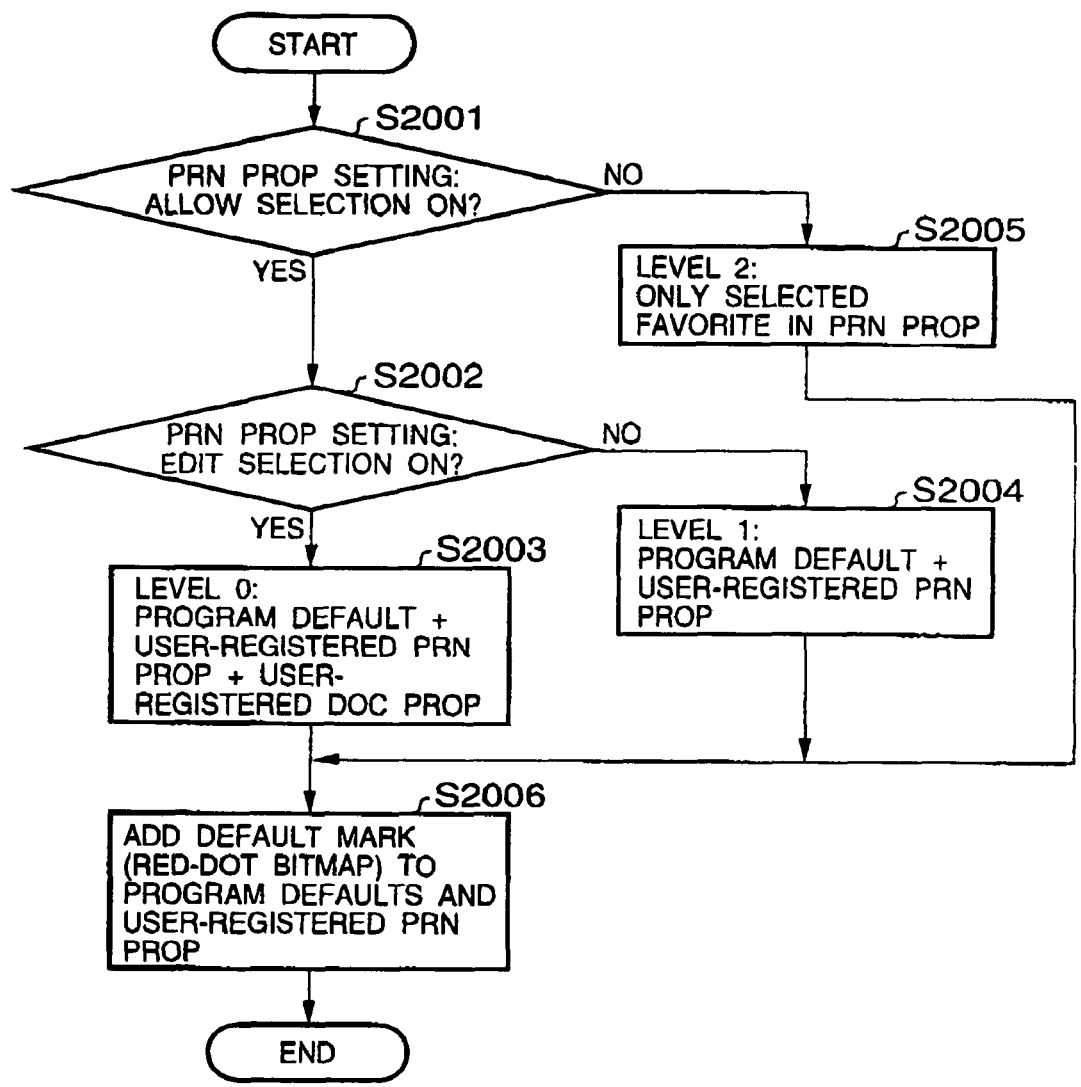
FIG. 20 is a flowchart illustrating processing for listing favorite document properties.

Since the edit button 1203 is disabled at step S1302 in FIG. 13 in case of a level other than Level 0, the present flow becomes necessary from the flow of FIG. 19 only in a case where Level 0 holds.

In accordance with this embodiment, items can be registered in the databases independently from the setting screen for the server and the setting screen for printing.

Since server data is available, labor on the part of the administrator for the purpose of making settings at all clients can be eliminated. Since data for individuals is available, light usage on an individual level can be realized without involving the administrator. The system is easy to use because both advantages can be enjoyed simultaneously.

Since it does not matter if registered names in one database are duplicates of those in the other database, there are few restrictions at the time of registration and at the time of selection. Because server data is marked, it is possible for users also to distinguish and utilize this data.

Since server data cannot be edited or deleted from the print setting screen, settings shared by all hosts cannot be destroyed in a simple manner.

Further, it is possible to apply restrictions manipulation of the print setting screen from the setting screen for the server.

Major users or the like can exercise control in such a manner that individual clients are not allowed to perform uncalled-for (erroneous) operations.

Furthermore, all clients can be fixed at specific print settings.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In a case where the present embodiment is applied to the above-mentioned storage medium, program code corresponding to the flowcharts of FIGS. 7, 9, 10, 13, 17, 19 and 20 described earlier are stored on the storage medium. In other words, it will suffice to provide a storage medium with a memory map of the kind shown in FIG. 22.

In a case where this embodiment is implemented by such program code, it will suffice to store each module in the storage device 12 of FIG. 2 and subject input image data to processing by control centered on the CPU 1 and RAM 2.

Thus, in accordance with the foregoing embodiment, as described above, it is possible to provide an information processing apparatus, system and method wherein an image forming apparatus can be managed effectively.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus which connects to a printer and to a plurality of client computers, each of the plurality of client computers having a printer driver and a personal database, the apparatus having a server database which is shared by the plurality of client computers, the apparatus comprising:

a control unit configured to store a first plurality of print profiles which are common for the plurality of client computers in the server database, and to cause the plurality of client computers to respectively store a second plurality of print profiles specific to respective client computers in the personal databases of the respective client computers, wherein each of the print profiles of the first and second plurality of print profiles includes a plurality of printer driver parameters of the printer driver for defining print settings of the printer;

a printer designating unit configured to designate the printer;

a setting unit configured to set a mode for displaying a print profile on a graphical user interface, the mode including a first mode and a second mode;

a profile selecting unit configured to: (i) select a print profile of the printer driver of the designated printer from the first plurality of print profiles stored in the server database when the setting unit sets the first mode, and (ii) select a print profile of the printer driver of the designated printer from the first plurality of print profiles and the second plurality of print profiles stored in each of the server database and the personal database when the setting unit sets the second mode; and a display control unit configured to control the client computer to display the print profile selected by the profile selecting unit on the graphical user interface depending on the mode set by the setting unit, wherein, when the setting unit sets the first mode, the graphical user interface does not accept a user instruction for editing or adding a printer driver parameter of the printer driver so as to limit a user's setting parameters within the print profile selected by the profile selecting unit, and when the setting unit sets the second mode, graphical user interface accepts a user instruction for editing and/or adding a printer driver parameter of the printer driver.

2. The apparatus according to claim 1, wherein each set of the printer driver parameters specifies at least one of a page layout, print method, and paper discharge method.

3. The apparatus according to claim 1,
wherein in the first mode, the printer driver in the client computer can select a set of the printer driver parameters and in the second mode, the printer driver in the client computer can edit a set of the printer driver parameters.

4. An information processing method, for use with an information processing apparatus which connects to a printer and to a plurality of client computers, each of the plurality of client computers having a printer driver and a personal database, the apparatus having a server database which is shared by the plurality of client computers, the method comprising:

a storing step configured to store a first plurality of print profiles which are common for the plurality of client computers in the server database, and to cause the plurality of client computers to respectively store a second plurality of print profiles specific to respective client computers in the personal databases of the respective client computers, wherein each of the print profiles of the first and second plurality of print profiles includes a plurality of printer driver parameters of the printer driver for defining print settings of the printer;

a designating step configured to designate the printer;

a setting step configured to set a mode for displaying a print profile on a graphical user interface, the mode including a first mode and a second mode;

a profile selecting step configured to: (i) select a print profile of the printer driver of the designated printer from the first plurality of print profiles stored in the server database when the setting step sets the first mode, and (ii) select a print profile of the printer driver of the designated printer from the first plurality of print profiles and the second plurality of print profiles stored in each of the server database and the personal database when the setting step sets the second mode; and a displaying step configured to control the client computer to display the print profile selected by the profile selecting step on the graphical user interface depending on the mode set in said setting step, wherein, when the setting step sets the first mode, the graphical user interface does not accept a user instruction for editing or adding a printer driver parameter of the printer driver so as to limit a user's setting parameters within the print profile selected by the profile selecting step, and when the setting step sets the second mode, the graphical user interface accepts a user instruction for editing and/or adding a printer driver parameter of the printer driver.

5. The method according to claim 4, wherein each set of the printer driver parameters specifies at least one of a page layout, print method, and paper discharge method.

6. The method according to claim 4, wherein in the first mode the printer driver in the client computer can select a set of the printer driver parameters and in the second mode the printer driver in the client computer can edit a set of the printer driver parameters.

7. A storage medium storing a computer executable program product which connects to a printer and to a plurality of client computers, each of the plurality of client computers having a printer driver and a personal database, the apparatus having a server database which is shared by the plurality of client computers, the program product comprising:

a storing step configured to store a first plurality of print profiles which are common for the plurality of client computers in the server database, and to cause the plurality of client computers to respectively store a second plurality of print profiles specific to respective client computers in the personal databases of the respective client computers, wherein each of the print profiles of the first and second plurality of print profiles includes a plurality of printer driver parameters of the printer driver for defining print settings of the printer;

a designating step configured to designate the printer;

a setting step configured to set a mode for displaying a print profile on a graphical user interface, the mode including a first mode and a second mode;

a profile selecting step configured to: (i) select a print profile of the printer driver of the designated printer from the first plurality of print profiles stored in the server database when the setting step sets the first mode, and (ii) select a print profile of the printer driver of the designated printer from the first plurality of print profiles and the second plurality of print profiles stored in each of the server database and the personal database when the setting step sets the second mode; and a displaying step configured to control the client computer to display the print profile selected by the profile selecting step on the graphical user interface depending on the mode set in said setting step, wherein, when the setting step sets the first mode, the graphical user interface does not accept a user instruction for editing or adding a printer driver parameter of the printer driver so as to limit a user's setting parameters within the print profile selected by the profile selecting step, and when the setting step sets the second mode, the graphical user interface accepts a user instruction for editing and/or adding a printer driver parameter of the printer driver.

8. The storage medium according to claim 7, wherein each set of the printer driver parameters specifies at least one of a page layout, print method, and paper discharge method.

9. The storing medium according to claim 7, wherein in the first mode the printer driver in the client computer can select a set of the printer driver parameters and in the second mode, the printer driver in the client computer can edit a set of the printer driver parameters.

* * * * *